(12) United States Patent
Sturdivant

(10) Patent No.: US 6,185,471 B1
(45) Date of Patent: Feb. 6, 2001

(54) METHOD FOR LABELING ROOFING SHINGLES USING BINARY CODING SCHEME, AND SHINGLES PRODUCED BY THE METHOD

(76) Inventor: David H. Sturdivant, 732 76th St., Tuscaloosa, AL (US) 35405

(*) Notice: Under 35 U.S.C. 154(b), the term of this patent shall be extended for 0 days.

(21) Appl. No.: 09/081,086

(22) Filed: May 19, 1998

(51) Int. Cl.[7] ................................................ G06F 19/00
(52) U.S. Cl. .................... 700/115; 700/134; 700/215; 700/226; 52/519; 52/523; 30/152; 427/186; 427/187
(58) Field of Search .................. 700/115, 134, 700/214, 215, 221, 224, 225, 226, 227; 156/247, 277, 289; 427/187, 186; 428/143, 149, 150, 338, 489; 52/531, 529, 519, 523; 29/527.4, 518, 529, 530, 531; 30/123, 143, 152; 86/1

(56) References Cited

U.S. PATENT DOCUMENTS

| | | | |
|---|---|---|---|
| 5,278,885 | * | 1/1994 | Davis et al. ............................. 378/45 |
| 5,778,536 | * | 7/1998 | West ....................................... 30/123 |
| 5,951,809 | * | 9/1999 | Jenkins et al. ....................... 156/277 |

OTHER PUBLICATIONS

Strong et al., "World Overview O f Building–Integreated Photovoltaics" IEEE., pp. 1197–1202, 1996.*

* cited by examiner

Primary Examiner—William Grant
Assistant Examiner—McDieunel Marc
(74) Attorney, Agent, or Firm—Jacobson, Price, Holman & Stern, PLLC

(57) ABSTRACT

Information as to the location, date and shift of manufacture of roofing shingles is cut into an edge of the shingles as a coded sequence of slits. Preferably, the slit sequence is coded using a binary coding scheme, with a separate binary number group defining each of the shift, the month, the day and the year of manufacture, in addition to plant site identification information. Based on the easily-cut, binary-coded slit sequence, used in conjunction with the plant site identification information, a manufacturer can quickly isolate the time and place of a manufacturing defect. The method of providing a roofing shingle with a coded indication of the shingle's time of manufacture involves arranging a physically-ordered sequence of slit cutting knives, based on a sequence of binary digits, in which a slit cutting knife is provided in the physically-ordered sequence when a corresponding binary digit in the sequence of binary digits is a first value (e.g, 1), a slit cutting knife is omitted from the physically-ordered sequence when a corresponding binary digit is a second value (e.g., 0). The binary digits in the sequence of binary digits are arranged in plural fields that represent respective time periods collectively constituting the coded indication of the shingle's time of manufacture. The method also involves cutting the coded sequence of slits into the shingle using the slit cutting knives.

19 Claims, 4 Drawing Sheets

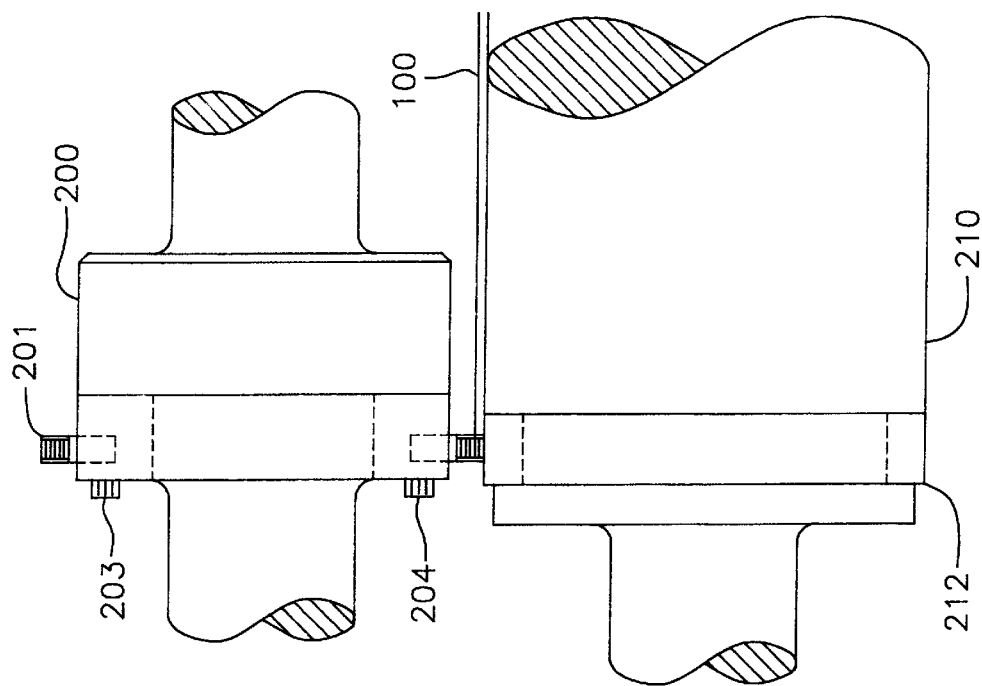
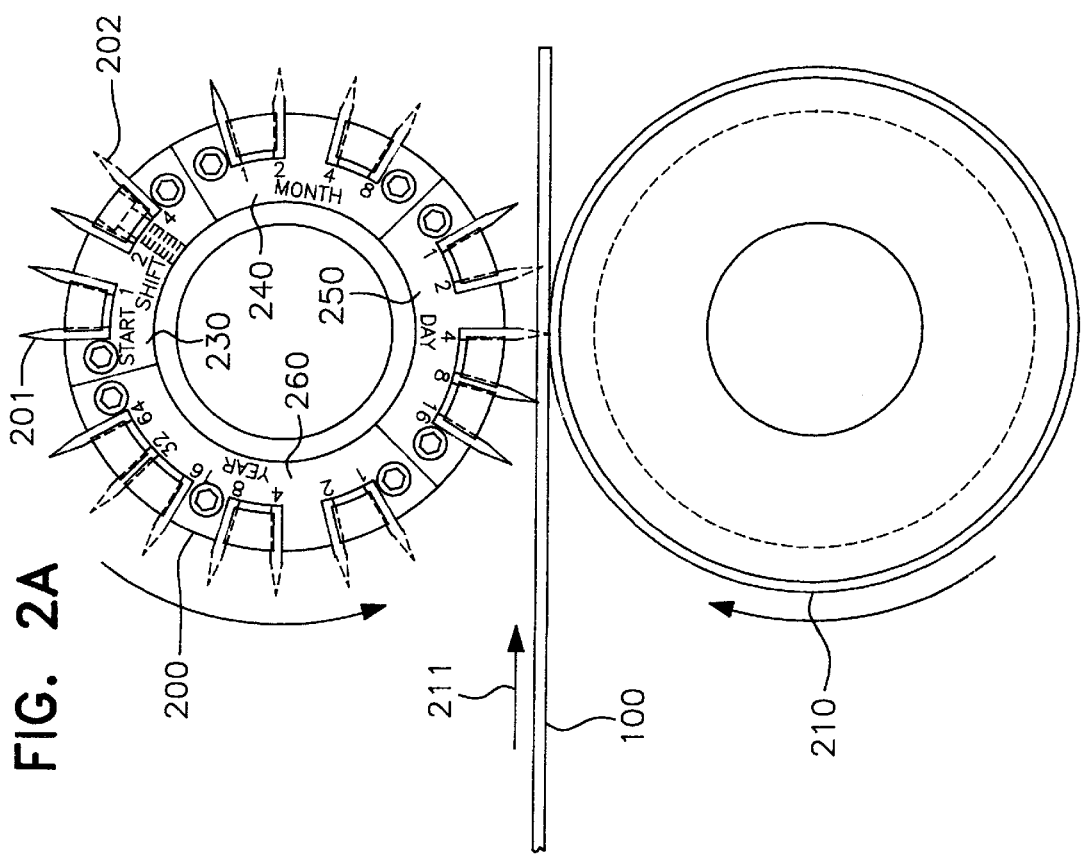

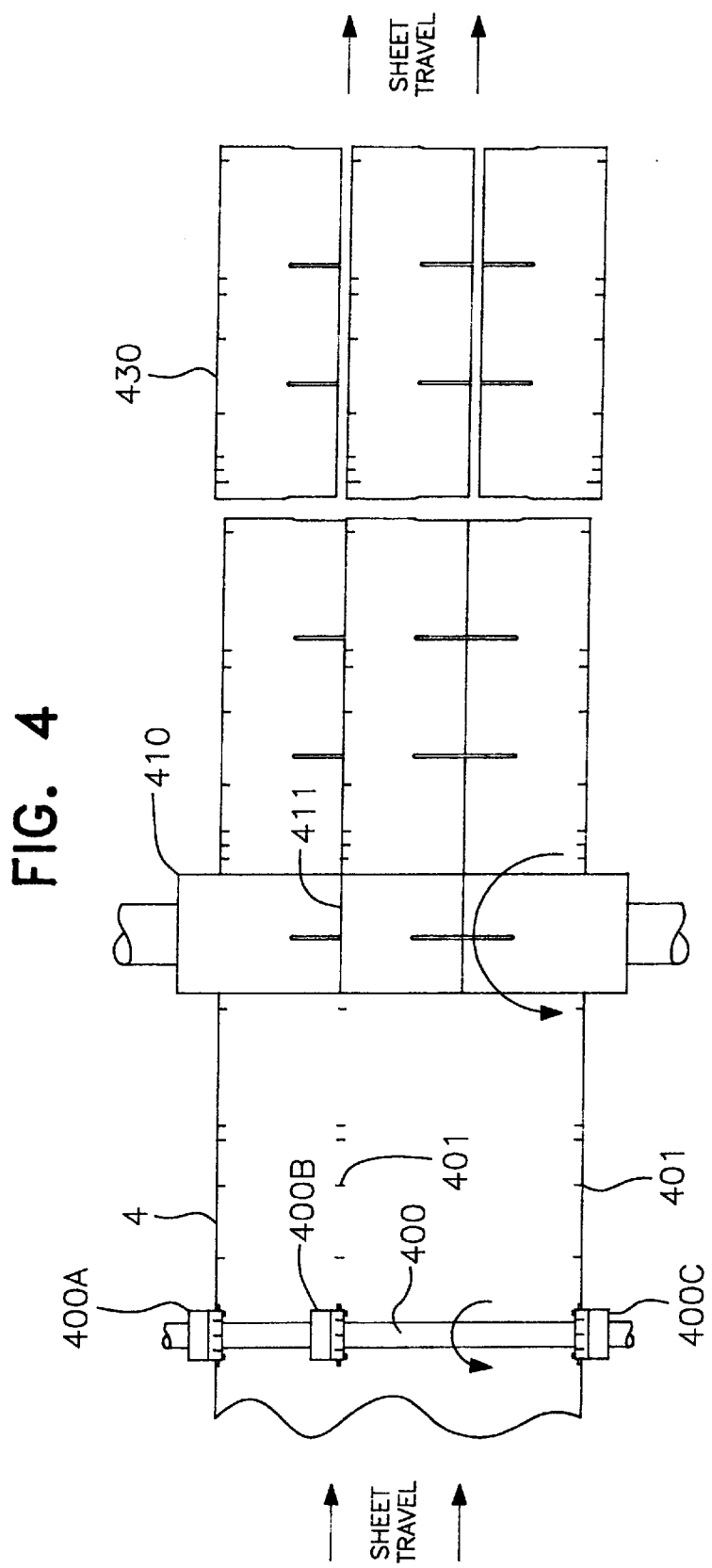

US 6,185,471 B1

METHOD FOR LABELING ROOFING SHINGLES USING BINARY CODING SCHEME, AND SHINGLES PRODUCED BY THE METHOD

BACKGROUND OF THE INVENTION

1. Field of the Invention

The present invention relates to methods of labeling manufactured goods. More specifically, the invention relates to a method of labeling roofing shingles with information that is highly concentrated due to use of a binary coding scheme.

2. Related Art

For a variety of reasons, it is desirable to mark manufactured goods with tracking information. For example, in the roofing shingle industry, tracking information may include a slit that uniquely identifies the plant site at which a particular shingle was manufactured. Conventionally, the slit is made by passing an endless sheet of shingle material between a cutter head and an anvil roll, and a marker knife on the cutter head identifies the shingle as having been manufactured at that particular plant. Such tracking information allows a manufacturer to trace defective goods to a particular plant site, so that the defect can be investigated and remedied.

However, such simplistic labeling schemes provide little information. The bare identification of a plant site does not permit specific identification of a particular date on which a defect occurred, or the shift at that plant site that is responsible for the defect. This is a significant shortcoming when the defect occurs in only some of the shingles manufactured at the identified plant site, but not in other shingles manufactured at the same plant site. In this event, the cause of the defect cannot be localized or corrected, because the labeling system does not contain enough information to specify the exact location, date and shift of manufacture.

Thus, there is a need in the art to provide a method of easily providing enough information on manufactured roofing shingles so that the time and location of their manufacture can be quickly and uniquely determined, so that any manufacturing process defects can be isolated and corrected, and to provide information to defend against false warranty claims.

SUMMARY OF THE INVENTION

It is to meet the foregoing need that the present invention is directed. The goal of identifying a set of manufactured shingles specifically enough to isolate the location and time of a manufacturing defect has not been achieved conventionally, perhaps because of the requirement for the substantial amount of information that must be inscribed on the shingles to achieve the unique identification that is necessary.

According to the invention, the required location, date and shift information is cut into the shingles as a coded sequence of slits. Preferably, the slit sequence is coded using a binary coding scheme, with a separate binary number group defining each of the shift, the month, the day and the year of manufacture, in addition to plant site identification information. Based on the easily-cut, binary-coded slit sequence, used in conjunction with the plant site identification information, a manufacturer can quickly isolate the time and place of a manufacturing defect.

The invention provides a method of providing an article of manufacture with a coded indication of the article's time of manufacture. The method involves arranging a physically-ordered sequence of slit cutting knives, based on a sequence of binary digits, in which a slit cutting knife is provided in the physically-ordered sequence when a corresponding binary digit in the sequence of binary digits is a first value (e.g., 1), and a slit cutting knife is omitted from the physically-ordered sequence when a corresponding binary digit in the sequence of binary digits is a second value (e.g., 0). The binary digits in the sequence of binary digits are arranged in plural fields that represent respective time periods collectively constituting the coded indication of the article's time of manufacture. The method also involves cutting a coded sequence of slits into the article using the slit cutting knives that have been provided in the arranging step.

The invention also provides an article, such as a roofing shingle, produced by this method.

Other objects, features and advantages of the invention will become apparent to those skilled in the art upon a reading of the following detailed description of the preferred embodiments with reference to the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIGS. 2A and 2B respectively illustrate side and end views of a first apparatus that may be used in the inventive method for cutting the binary-coded slit sequences into shingles.

FIG. 4 illustrates a third apparatus that may be used in the inventive method for cutting the binary-coded slit sequences into shingles.

DETAILED DESCRIPTION OF THE PREFERRED EMBODIMENTS

Figure 1:
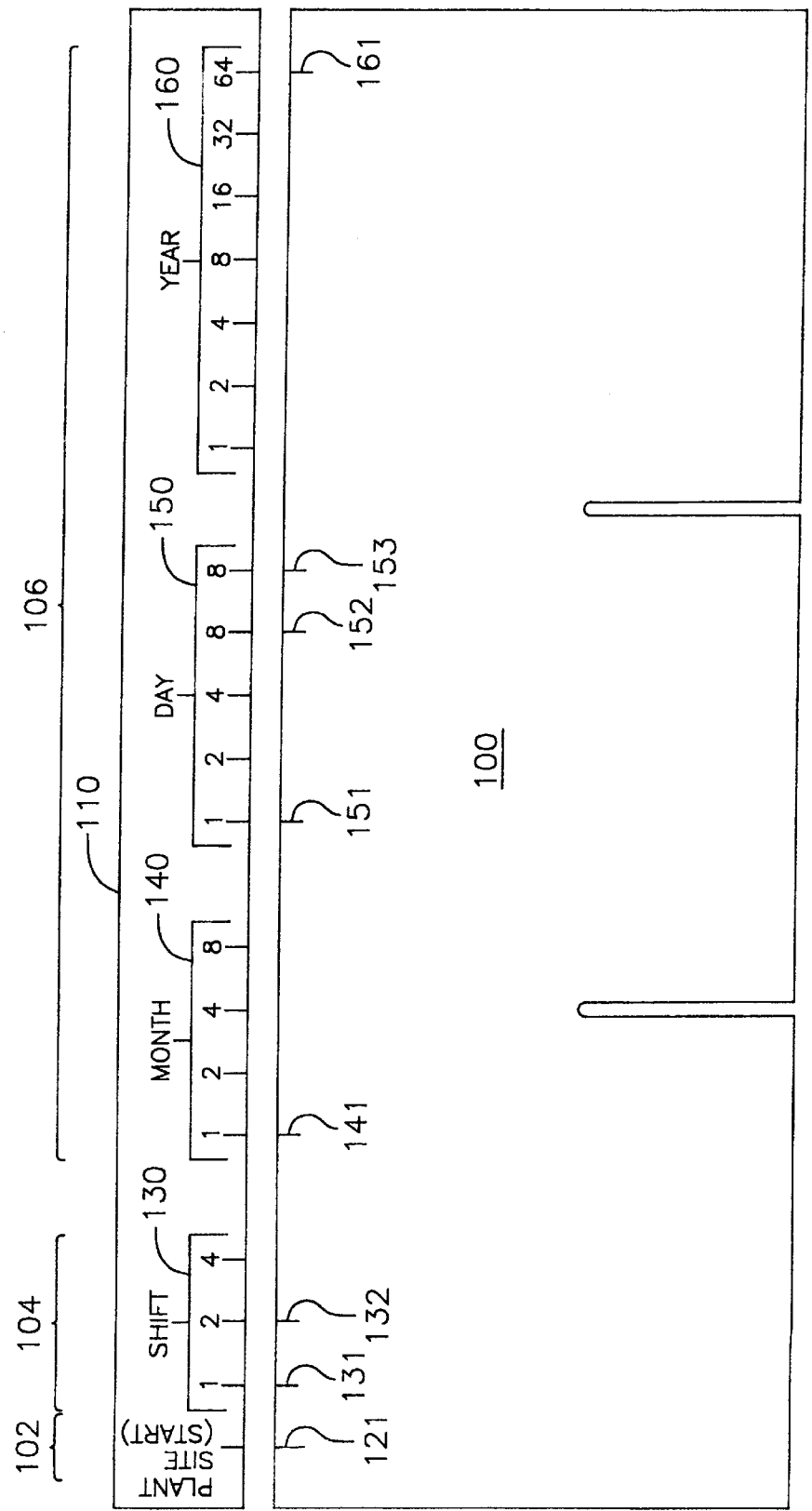
FIG. 1 is a diagram of a roofing shingle produced by a method according to the present invention, the roofing shingle showing plant site information in conjunction with binary-coded shift and date information that allow the location and time of the shingle's manufacture to be determined with use of a template.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

FIG. 1 shows a roofing shingle 100 produced by a method according to the present invention, alongside a template 110 that facilitates reading of information cut into the shingle. The roofing shingle 100 shows plant site information 102 in conjunction with binary-coded shift information 104 and binary-coded date information 106. Collectively, this information 102, 104 106 allows the location and time of the shingle's manufacture to be uniquely determined.

In the illustrated example, only a single slit 121 is provided for identification of the plant site producing the shingle. The slit 121 is, in this example, longer than the binary-coded slits that represent shift and date information.

The binary-coded slit sequences are arranged in a plurality of fields 130, 140, 150, 160 that are spaced and arranged to be juxtaposed with template 110 to facilitate reading of the encoded information. To allow the slit sequence to be read from the side of the shingle not shown in FIG. 1, the other side (not shown) of template 110 is marked with the same numeric inscriptions and legends as illustrated in FIG. 1, except of course in reverse order to account for the fact that the ordering of the slit sequence is reversed when the shingle is turned over. It is recognized that, regardless of which side of the shingle is visible, the unique (for example, greater) length of slit 121 helps to identify the direction of reading (left-to-right versus right-to-left). Preferably, the length of slits 131, 132 in "shift" field 130 (described below) is also unique. In this arrangement, the template 110 is initially positioned based on the location of slit 121, and the direction of reading (left-to-right versus right-to-left) is determined based on the position of slits 131, 132 relative to slit 121.

Field 130 is dedicated to uniquely identifying the shift during which the shingle was manufactured. In the illustrated example, slits 131 and 132 are cut opposite the first and second binary digits (bits) in the shift field. The presence of only the slits in positions 1 and 2 represents the binary number 011, which in turn implies the shingle was manufactured during the third shift (since binary 011 is decimal 1+2+0=3).

Field 140 is dedicated to uniquely identifying the month during which the shingle was manufactured. In the illustrated example, only slit 141 is cut, opposite the 1 position in the month field. The presence of only the slit in position 1 represents the binary number 0001, which in turn implies the shingle was manufactured during January (since binary 0001 is decimal 1+0+0+0=1, or the first month, January).

Similarly, field 150 is dedicated to uniquely identifying the day of the month during which the shingle was manufactured. In the illustrated example, slits 151, 152 and 153 are cut opposite the 1, 8 and 16 positions in the day field. The presence of slits only in positions 1, 8 and 16 represents the binary number 11001, which in turn implies the shingle was manufactured during the twenty-fifth day of the month (since binary 11001 is decimal 1+0+0+8+16=25).

Finally, field 160 is dedicated to uniquely identifying the last two digits of the year during which the shingle was manufactured. In the illustrated example, slit 161 is cut opposite the 64 position in the year field. The presence of a slit only in position 64 represents the binary number 1000000, which in turn implies the shingle was manufactured during 1964 (since binary 1000000 is decimal 0+0+0+0+0+0+64=64).

Thus, using the template 110, one can easily determine that the shingle in FIG. 1 was manufactured during the third shift on Jan. 25, 1964.

In the illustrated example, the slits are cut into the "top" edge of the shingle (the edge that is not visible when the shingle is installed. However, placement of slits or markings in other areas of the shingle lies within the contemplation of the invention.

An exemplary product having been described, three exemplary apparatus for carrying out the inventive method are described.

FIGS. 2A and 2B respectively illustrate side and end views of a first apparatus used in the inventive method for cutting the binary-coded slit sequences into manufactured shingles. A generally cylindrical cutter head 200 is oriented with its axis parallel to that of an anvil roll 210. As seen in FIG. 2A, the cutter head has sections 230, 240, 250, 260 that are arranged circumferentially around the outside of the cutter head, attached to the cutter head body via suitable means such as threaded screws 203, 204. Sections 230, 240, 250, 260 correspond, respectively, to shift, month, day, and year fields 130, 140, 150, 160 in FIG. 1.

Reference numeral 201 illustrates a cutter knife that has been installed in section 230. Reference numeral 202 illustrates (with phantom lines) a location in which a cutter knife is absent. When a cutter knife is present, a binary 1 is indicated; and when a cutter knife is absent then a binary 0 is indicated. The plant site cutter knife 201 is shown in a position that may be considered to correspond to a "start" position, and should be aligned near the leading end of the shingle so that all cutter knife positions encounter the shingle before the shingle passes completely out of the apparatus. Anvil roll 210 is provided with a tungsten carbide wear ring 212 arranged opposite cutter knives on the cutter head, to provide long wear.

In operation, a shingle 100 is passed between the counter-rotating cutter head and anvil roll, and the shingle is moved in the direction of arrow 211. When a cutter knife is present, a slit is cut in the shingle, preferably (though not necessarily) along the "top" edge of the shingle as shown in FIG. 1. When a slit is present, it corresponds to a binary number that contributes to a number in the corresponding field on template 110. When a cutter knife is absent, no slit is cut, indicating the absence of a binary number that would contribute to a number in that field.

Figure 3A:
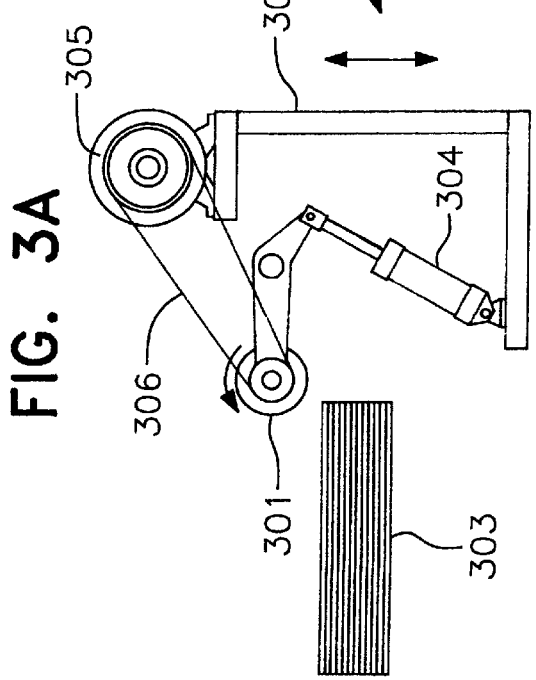
FIGS. 3A and 3B respectively illustrate side and plan views of a second apparatus that may be used in the inventive method for cutting the binary-coded slit sequences into shingles.
Figure 3B:
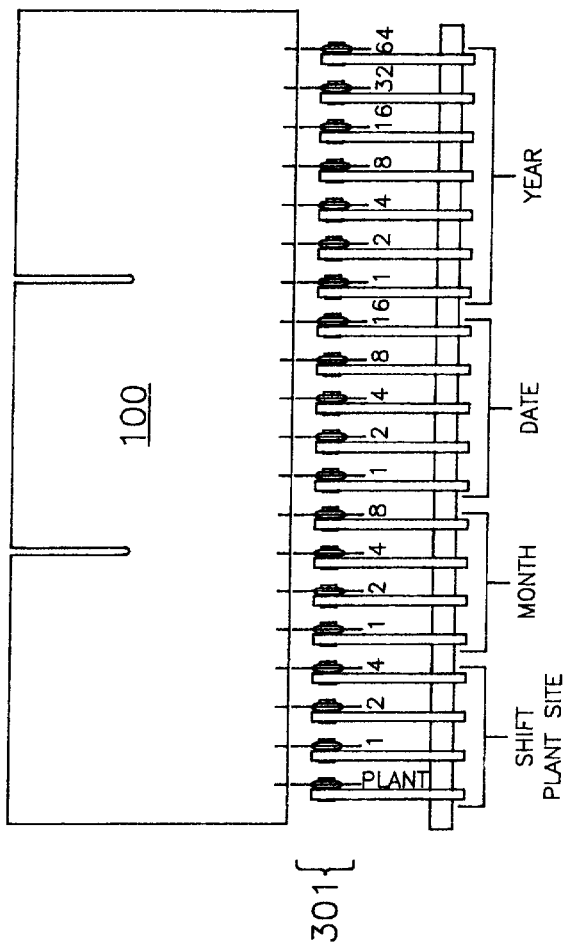

The apparatus of FIGS. 2A and 2B marks shingles, either before they are cut from a sheet of shingle material into discrete shingles, or after they have been cut into discrete shingles. If it is preferred to mark shingles that are already cut and stacked, the embodiment of FIGS. 3A and 3B is also provided. FIGS. 3A and 3B respectively illustrate side and plan views of a second apparatus used in the inventive method for cutting the binary-coded slit sequences into plural shingles in a single operation.

FIGS. 3A and 3B show an apparatus 300 for marking all shingles in a stack 303 of shingles, in a single operation. The apparatus includes a frame 302 supporting a motor 305 that rotates an array 301 of coaxially-arranged rotatable cutter knives. The position of a given cutter knife (extended or retracted) in the cutter array 301 is controlled by the position of a respective air cylinder, an exemplary one of which is illustrated as element 304.

When a given cutter knife is extended, a slit is cut in the shingles in the stack, and corresponds to the presence of a binary value at that position in that field. Conversely, when a given cutter knife is retracted, a slit is not cut in the shingles in the stack at that point, which corresponds to the absence of a binary value at that position in that field.

In operation, the entire apparatus 300 is moved up or down with respect to the stack 303 of shingles, or, alternatively, the stack 303 of shingles is moved up or down with respect to the apparatus 300. In either event, binary-coded slits are cut in all shingles in the stack in a single operation.

FIG. 4 illustrates a plan view of a third apparatus that may be used in the inventive method for cutting the binary-coded slit sequences into shingles.

Referring to FIG. 4, a solid sheet 4 of shingle material, that may be (for example) one yard or one meter wide, travels longitudinally in the direction indicated by arrows. Sheet 4 passes first between plural marker cutter heads 400A, 400B, 400C and then under a shingle cutter head 410.

It is understood that cutter heads 400A, 400B, 400C and 410 have two respective anvil rolls that are not visible in FIG. 4. The two cutter heads have respective sets of cutter knives that, with the anvil rolls, allow narrow slits or wider slots to be cut in the shingles.

In the illustrated embodiment, the marker cutter heads 400A, 400B, 400C are arranged coaxially along a common rotating shaft 400. The cutter heads are displaced axially at positions that cause coded sequences of slits 401 to be cut at proper locations on sheet 4.

Downstream from the point at which slits 401 are cut, the sheet 4 passes under the single cutter head 410. Cutter head 410 has shingle cutter head knives 411 that cut the sheet longitudinally, as well as other knives (not shown in FIG. 4) that cut the sheet transversely. Individual shingles 430 are thus produced.

The shingle cutter head knives 411 are arranged at axial positions on shingle cutter head 410 that ensure that slits 401 are at the proper edges of the individual shingles 430.

In a particular preferred embodiment, the circumference of marker cutter heads 400A, 400B, 400C is less than half the circumference of shingle cutter head 410. This relationship ensures that each sequence of slits 401 is cut at least twice in each individual shingle, and each shingle includes at least one non-disjointed slit sequence (a sequence that is not truncated by the end of the shingle). This arrangement has the advantage that the rotation of the marker cutter heads 400A, 400B, 400C does not have to be synchronized to the rotation of the shingle cutter head 410. As noted with reference to the example in FIG. 1, a first slit (such as a plant site slit) is longer than other slits, thus indicating where a coded slit sequence begins.

Alternatively, it is envisioned that marker cutter heads 400A, 400B, 400C are synchronized to the rotation of the shingle cutter head 410. Such synchronization can be achieved by gears, notched belts, or other suitable means known to those skilled in the art. In this arrangement, an uninterrupted slit sequence is provided even if the circumference of the market cutter heads 400A, 400B, 400C is not less than twice the circumference of shingle cutter head 410. Thus, essentially the entire length of an edge of a shingle can be used to bear a single coded slit sequence, as illustrated in the example of FIG. 1.

Modifications and variations of the above-described embodiments of the present invention are possible, as appreciated by those skilled in the art in light of the above teachings. For example, the choice, ordering and organization of fields may be varied; FIG. 3B shows how the shift and plant site fields may be combined into a single field. Also, various coding methods may be chosen other than the particular binary coding method that has been illustrated. Moreover, the location of the slits, or the choice of markings or cuttings other than linear slits, also lie within the contemplation of the invention. Further, apparatus other than those described above may be used to practice the inventive method or produce articles marked according to the invention. It is therefore to be understood that, within the scope of the appended claims and their equivalents, the invention may be practiced otherwise than as specifically described.

What is claimed is:

1. A method of providing an article of manufacture with a coded indication of the article's time of manufacture, the method comprising:

a) arranging a physically-ordered sequence of slit cutting knives, based on a sequence of binary digits, wherein:

1) a slit cutting knife is provided in the physically-ordered sequence when a corresponding binary digit in the sequence of binary digits is a first binary value;

2) a slit cutting knife is omitted from the physically-ordered sequence when a corresponding binary digit in the sequence of binary digits is a second binary value; and 3) the binary digits in the sequence of binary digits are arranged in plural fields that represent respective time periods collectively constituting the coded indication of the article's time of manufacture; and b) cutting a coded sequence of slits into the article using the slit cutting knives that have been provided in the arranging step.

2. The method of claim 1, wherein:

the article is a roofing shingle.

3. The method of claim 2, wherein the cutting step includes:

cutting the slits in a top edge of the roofing shingle.

4. The method of claim 2, wherein the fields in the sequence of binary digits include:

a "month" field representing the shingle's month of manufacture;

a "day" field representing the shingle's day of manufacture; and a "year" field representing the shingle's year of manufacture;

so that the roofing shingle has three fields in which slits are cut to respectively represent the roofing shingle's month, day and year of manufacture.

5. The method of claim 4, wherein the fields in the sequence of binary digits further include:

a "shift" field representing a working shift during which the roofing shingle was manufactured.

6. The method of claim 2, wherein:

the arranging step comprises including, or omitting, cutter blades on a rotating cutter head, based on the sequence of binary digits; and the cutting step includes passing the roofing shingle by the rotating cutter head so that cutter blades that are included on the cutter head cut slits in the roofing shingle and so that slits are not cut at positions in the roofing shingle corresponding to cutter blades that are omitted from the rotating cutter head.

7. The method of claim 2, wherein:

the arranging step comprises extending, or retracting, cutter blades on a cutter array, based on the sequence of binary digits; and the cutting step includes relatively moving a stack of plural roofing shingles by the cutter array, so that cutter blades that are extended cut slits in the roofing shingles, and so that slits are not cut at positions in the roofing shingles corresponding to cutter blades that are retracted.

8. The method of claim 2, wherein the cutting step includes:

cutting the coded sequence of slits into a sheet of material from which shingles are later individually cut.

9. The article of claim 1, wherein:

the article is a roofing shingle.

10. The article of claim 9, wherein the cutting step includes:

cutting the slits in a top edge of the roofing shingle.

11. The article of claim 9, wherein the fields in the sequence of binary digits include:

a "month" field representing the shingle's month of manufacture;

a "day" field representing the shingle's day of manufacture; and a "year" field representing the shingle's year of manufacture;

so that the roofing shingle has three fields in which slits are cut to respectively represent the roofing shingle's month, day and year of manufacture.

12. The article of claim 11, wherein the fields in the sequence of binary digits further include:

a "shift" field representing a working shift during which the roofing shingle was manufactured.

13. The article of claim 9, wherein:

the arranging step comprises including, or omitting, cutter blades on a rotating cutter head, based on the sequence of binary digits; and the cutting step includes passing the roofing shingle by the rotating cutter head so that cutter blades that are included on the cutter head cut slits in the roofing shingle and so that slits are not cut at positions in the roofing shingle corresponding to cutter blades that are omitted from the rotating cutter head.

14. The article of claim 9, wherein:

the arranging step comprises extending, or retracting, cutter blades on a cutter array, based on the sequence of binary digits; and the cutting step includes relatively moving a stack of plural roofing shingles by the cutter array, so that cutter blades that are extended cut slits in the roofing shingles, and so that slits are not cut at positions in the roofing shingles corresponding to cutter blades that are retracted.

15. The article of claim 9, wherein the cutting step includes:

cutting the coded sequence of slits into a sheet of material from which shingles are later individually cut.

16. A roofing shingle having a coded indication of the shingle's time of manufacture, the shingle comprising:

a planar shingle body into which is cut a physically-ordered sequence of slits that are based on a corresponding sequence of binary digits, wherein:

1) a slit is provided in the physically-ordered sequence when a corresponding binary digit in the sequence of binary digits is a first binary value;

2) a slit is omitted from the physically-ordered sequence when a corresponding binary digit in the sequence of binary digits is a second binary value; and 3) the binary digits in the sequence of binary digits are arranged in plural fields that represent respective time periods collectively constituting the coded indication of the article's time of manufacture.

17. The shingle of claim 16, wherein:

the slits are cut in a top edge of the roofing shingle.

18. The shingle of claim 16, wherein the fields in the sequence of binary digits include:

a "month" field representing the shingle's month of manufacture;

a "day" field representing the shingle's day of manufacture; and a "year" field representing the shingle's year of manufacture;

so that the roofing shingle has three fields in which slits are cut to respectively represent the roofing shingle's month, day and year of manufacture.

19. The shingle of claim 18, wherein the fields in the sequence of binary digits further include:

a "shift" field representing a working shift during which the roofing shingle was manufactured.

* * * * *